US012746971B2

(12) United States Patent
Murakami et al.

(10) Patent No.: US 12,746,971 B2
(45) Date of Patent: Sep. 29, 2026

(54) TRAILER LOWER END COORDINATE CALCULATION DEVICE, TRAILER LOWER END COORDINATE CALCULATION METHOD, AND NON-TRANSITORY RECORDING MEDIUM

(71) Applicants: TOYOTA JIDOSHA KABUSHIKI KAISHA, Toyota (JP); DENSO CORPORATION, Kariya-city (JP)

(72) Inventors: Ryota Murakami, Tokyo-to (JP); Masahiro Kawabata, Tokyo-to (JP)

(73) Assignees: TOYOTA JIDOSHA KABUSHIKI KAISHA, Toyota (JP); DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/184,507

(22) Filed: Apr. 21, 2025

(65) Prior Publication Data

US 2025/0333110 A1 Oct. 30, 2025

(30) Foreign Application Priority Data

Apr. 24, 2024 (JP) ................................. 2024-070941

(51) Int. Cl.
*B62D 15/02* (2006.01)
*B60R 1/26* (2022.01)
*B62D 13/06* (2006.01)

(52) U.S. Cl.
CPC ................ *B62D 15/02* (2013.01); *B60R 1/26* (2022.01); *B62D 13/06* (2013.01)

(58) Field of Classification Search
CPC ........ B62D 15/02; B62D 13/06; B62D 13/00; B62D 15/023; B62D 15/029; B60R 1/26
See application file for complete search history.

(56) References Cited

U.S. PATENT DOCUMENTS 6,806,809 B2 * 10/2004 Lee .......................... B60D 1/58 340/435
9,607,242 B2 * 3/2017 Lavoie ................... G06V 20/56
9,738,125 B1 * 8/2017 Brickley ............... B60W 50/14
9,937,953 B2 * 4/2018 Lavoie ..................... B60D 1/62
9,981,690 B2 * 5/2018 Lavoie ................. B62D 15/024
10,829,046 B2 * 11/2020 Nagasamy ............. B60D 1/245
(Continued)

FOREIGN PATENT DOCUMENTS

JP 2023-514845 A 4/2023
JP 2023-096390 A 7/2023

*Primary Examiner* — Curtis J King
(74) *Attorney, Agent, or Firm* — Dinsmore & Shohl LLP

(57) ABSTRACT

A trailer lower end coordinate calculation device removes coordinates of left and right lower ends of trailer and hitch ball in world coordinate system satisfying coordinate removal condition from coordinates in world coordinate system of left and right lower ends and hitch ball included in images shot by camera mounted on vehicle towing trailer via tow bar during calibration travel of vehicle, and calculates coordinates of the left and right lower ends in world coordinate system at predetermined time point after calibration travel of vehicle based on hitch angle of trailer at predetermined time point, average distance between left or right lower end and hitch ball, average angle formed by left lower end, hitch ball and right lower end, and average coordinate of hitch ball in the world coordinate system, by using coordinates which are not removed.

5 Claims, 6 Drawing Sheets

(56) References Cited

U.S. PATENT DOCUMENTS 10,899,385 B2 * 1/2021 Gali ........................ B60Q 9/00
11,077,795 B2 * 8/2021 Jales Costa ............. B60R 1/003
11,591,018 B2 * 2/2023 Maruoka ................ B62D 13/06
11,721,108 B2 * 8/2023 El-sawah ............... G06V 10/82
382/181
12,049,253 B2 * 7/2024 Gali ........................ B60Q 9/00
12,479,433 B2 * 11/2025 Kong ...................... B60R 1/072
2015/0197281 A1 * 7/2015 Miller .................... B60D 1/245
701/41
2015/0217693 A1 * 8/2015 Pliefke ................... B60D 1/245
348/118
2016/0023525 A1 * 1/2016 Lavoie ................... B60D 1/305
701/70
2016/0375831 A1 * 12/2016 Wang ...................... B60D 1/36
348/148
2016/0378118 A1 * 12/2016 Zeng ....................... B60D 1/36
701/28
2017/0140228 A1 * 5/2017 Lang ...................... B60R 1/002
2018/0253608 A1 * 9/2018 Diessner ................. B60R 1/003
2019/0217888 A1 * 7/2019 Perry ................... B62D 15/028
2019/0241126 A1 * 8/2019 Murad .................... B60R 1/003
2019/0337344 A1 * 11/2019 Yu ............................ B60D 1/36
2020/0023695 A1 * 1/2020 Niewiadomski ......... B60D 1/06
2020/0156425 A1 * 5/2020 Xu ........................... B60D 1/36
2021/0094473 A1 * 4/2021 Gali ........................ B60R 1/003
2021/0341929 A1 * 11/2021 Gali .......................... B60R 1/00
2023/0173998 A1 6/2023 Plowman et al.
2023/0331160 A1 * 10/2023 Diessner .................. B60D 1/62
2024/0239366 A1 * 7/2024 Topolovec .............. B60R 11/04
2024/0273748 A1 * 8/2024 Diessner ................... G06T 7/73
2024/0383403 A1 * 11/2024 Kudo ........................ B60D 1/06
2024/0391388 A1 * 11/2024 Kudo ........................ B60R 1/25
2024/0409084 A1 * 12/2024 Tokoro ...................... B60T 7/20
2025/0026357 A1 * 1/2025 Tokoro .................. B60W 10/20
2025/0115295 A1 * 4/2025 Jung ...................... B62D 13/06
2025/0178668 A1 * 6/2025 Nitta ...................... B60D 1/245
2025/0292428 A1 * 9/2025 Tokoro ...................... G06T 7/60
2025/0319870 A1 * 10/2025 Tokoro ................ B60W 30/165
2026/0109402 A1 * 4/2026 Gali ....................... B62D 13/06
2026/0125111 A1 * 5/2026 Habibnejad Korayem ................
B62D 13/00

* cited by examiner

TRAILER LOWER END COORDINATE CALCULATION DEVICE, TRAILER LOWER END COORDINATE CALCULATION METHOD, AND NON-TRANSITORY RECORDING MEDIUM

CROSS-REFERENCE TO RELATED APPLICATIONS

This application claims priority to Japanese Patent Application No. 2024-070941 filed Apr. 24, 2024, the entire contents of which are herein incorporated by reference.

FIELD

The present disclosure relates to trailer lower end coordinate calculation device, trailer lower end coordinate calculation method, and non-transitory recording medium.

BACKGROUND

PTL 1 (JP-A-2023-0096390) discloses a technique for accurately setting center position of a marker of towed vehicle when towing vehicle and the towed vehicle are connected and traveling straight regardless of mounting position of the marker of the towed vehicle. In the technique disclosed in PTL 1, when the marker is mounted offset with respect to the vehicle front-rear direction central axis of the connection member for connecting the towing vehicle and the towed vehicle, offset correction is performed. As a result, even when the marker is mounted offset, the hitch angle (bending angle) of the towed vehicle can be correctly acquired based on an image of the marker.

A driver of a vehicle towing a trailer needs to operate the vehicle so that the trailer does not come into contact with an obstacle or the like. Therefore, simply presenting the hitch angle of the trailer obtained by the technique disclosed in PTL 1 does not result in performing appropriate driving assistance of the vehicle towing the trailer. In order to perform driving assistance to prevent the trailer from contacting the obstacle or the like, it is necessary to present the coordinates of left lower end and right lower end of the trailer in a world coordinate system. However, in the technique disclosed in PTL 1, it is impossible to perform the driving assistance of the vehicle towing the trailer by presenting the coordinates of the left lower end and the right lower end of the trailer in the world coordinate system.

SUMMARY

In view of the above-described points, it is an object of the present disclosure to provide trailer lower end coordinate calculation device, trailer lower end coordinate calculation method, and non-transitory recording medium that can perform driving assistance of a vehicle towing a trailer by presenting coordinates of left lower end and right lower end of the trailer in a world coordinate system.

(1) One aspect of the present disclosure is a trailer lower end coordinate calculation device including a processor configured to: acquire images shot by a camera mounted on a vehicle towing a trailer via a tow bar at time points during a calibration travel of the vehicle; calculate coordinates of left lower end of the trailer, right lower end of the trailer, and hitch ball on the images, the left lower end of the trailer, the right lower end of the trailer, and the hitch ball being included in each of the images; transform the coordinates of the left lower end on the images to the coordinates of the left lower end in a world coordinate system, transform the coordinates of the right lower end on the images to the coordinates of the right lower end in the world coordinate system, and transform the coordinates of the hitch ball on the images to the coordinates of the hitch ball in the world coordinate system; calculate a first average value which is an average value of a distance between the left lower end and the hitch ball in the world coordinate system during the calibration travel of the vehicle based on the coordinates of the left lower end and the hitch ball in the world coordinate system at time points during the calibration travel of the vehicle, and calculate a second average value which is the average value of the distance between the right lower end and the hitch ball in the world coordinate system during the calibration travel of the vehicle based on the coordinates of the right lower end and the hitch ball in the world coordinate system at time points during the calibration travel of the vehicle; remove the coordinates of the left lower end in the world coordinate system satisfying a first coordinate removal condition when the coordinates of the left lower end in the world coordinate system satisfying the first coordinate removal condition are included in the coordinates of the left lower end in the world coordinate system at time points during the calibration travel of the vehicle, remove the coordinates of the right lower end in the world coordinate system satisfying a second coordinate removal condition when the coordinates of the right lower end in the world coordinate system satisfying the second coordinate removal condition are included in the coordinates of the right lower end in the world coordinate system at time points during the calibration travel of the vehicle, and remove the coordinates of the hitch ball in the world coordinate system satisfying a third coordinate removal condition when the coordinates of the hitch ball in the world coordinate system satisfying the third coordinate removal condition are included in the coordinates of the hitch ball in the world coordinate system at time points during the calibration travel of the vehicle; calculate the average value of the distance between the left lower end and the hitch ball in the world coordinate system or the average value of the distance between the right lower end and the hitch ball in the world coordinate system, an average value of an angle formed by the left lower end, the hitch ball and the right lower end in the world coordinate system, and an average value of the coordinates of the hitch ball in the world coordinate system, by using the coordinates of left lower end, the right lower end and the hitch ball in the world coordinate system at time points during the calibration travel of the vehicle which are not removed; and calculate the coordinate of the left lower end in the world coordinate system at a predetermined time point after the calibration travel of the vehicle and the coordinate of the right lower end in the world coordinate system at the predetermined time point, based on a hitch angle of the trailer at the predetermined time point, the average value of the distance between the left lower end and the hitch ball in the world coordinate system or the average value of the distance between the right lower end and the hitch ball in the world coordinate system, the average value of the angle formed by the left lower end, the hitch ball and the right lower end in the world coordinate system, and the average value of the coordinates of the hitch ball in the world coordinate system.

(2) In the trailer lower end coordinate calculation device of the aspect (1), the processor may be configured to: determine that the first coordinate removal condition is satisfied when the coordinates of the left lower end in the world coordinate system during the calibration travel of the vehicle are located outside of a predetermined first area, and remove the coordinates of the left lower end in the world coordinate system at time points when the coordinates of the left lower end in the world coordinate system are located outside of the first area; determine that the second coordinate removal condition is satisfied when the coordinates of the right lower end in the world coordinate system during the calibration travel of the vehicle are located outside of the first area, and remove the coordinates of the right lower end in the world coordinate system at time points when the coordinates of the right lower end in the world coordinate system are located outside of the first area; and determine that the third coordinate removal condition is satisfied when the coordinates of the hitch ball in the world coordinate system during the calibration travel of the vehicle are located outside of a predetermined second area, and remove the coordinates of the hitch ball in the world coordinate system at time points when the coordinates of the hitch ball in the world coordinate system are located outside of the second area.

(3) In the trailer lower end coordinate calculation device of the aspect (1) or (2), the processor may be configured to: calculate a first standard deviation which is a standard deviation of a difference between the distance between the left lower end and the hitch ball in the world coordinate system during the calibration travel of the vehicle and the first average value; determine that the first coordinate removal condition is satisfied when the difference between the distance between the left lower end and the hitch ball in the world coordinate system during the calibration travel of the vehicle and the first average value is more than twice as large as the first standard deviation, and remove the coordinates of the left lower end in the world coordinate system at time points when the difference between the distance between the left lower end and the hitch ball in the world coordinate system and the first average value is more than twice as large as the first standard deviation; calculate a second standard deviation which is the standard deviation of the difference between the distance between the right lower end and the hitch ball in the world coordinate system during the calibration travel of the vehicle and the second average value; and determine that the second coordinate removal condition is satisfied when the difference between the distance between the right lower end and the hitch ball in the world coordinate system during the calibration travel of the vehicle and the second average value is more than twice as large as the second standard deviation, and remove the coordinates of the right lower end in the world coordinate system at time points when the difference between the distance between the right lower end and the hitch ball in the world coordinate system and the second average value is more than twice as large as the second standard deviation.

(4) Another aspect of the present disclosure is a trailer lower end coordinate calculation method including: acquiring images shot by a camera mounted on a vehicle towing a trailer via a tow bar at time points during a calibration travel of the vehicle; calculating coordinates of left lower end of the trailer, right lower end of the trailer, and hitch ball on the images, the left lower end of the trailer, the right lower end of the trailer, and the hitch ball being included in each of the images; transforming the coordinates of the left lower end on the images to the coordinates of the left lower end in a world coordinate system, transforming the coordinates of the right lower end on the images to the coordinates of the right lower end in the world coordinate system, and transforming the coordinates of the hitch ball on the images to the coordinates of the hitch ball in the world coordinate system; calculating a first average value which is an average value of a distance between the left lower end and the hitch ball in the world coordinate system during the calibration travel of the vehicle based on the coordinates of the left lower end and the hitch ball in the world coordinate system at time points during the calibration travel of the vehicle, and calculating a second average value which is the average value of the distance between the right lower end and the hitch ball in the world coordinate system during the calibration travel of the vehicle based on the coordinates of the right lower end and the hitch ball in the world coordinate system at time points during the calibration travel of the vehicle; removing the coordinates of the left lower end in the world coordinate system satisfying a first coordinate removal condition when the coordinates of the left lower end in the world coordinate system satisfying the first coordinate removal condition are included in the coordinates of the left lower end in the world coordinate system at time points during the calibration travel of the vehicle, removing the coordinates of the right lower end in the world coordinate system satisfying a second coordinate removal condition when the coordinates of the right lower end in the world coordinate system satisfying the second coordinate removal condition are included in the coordinates of the right lower end in the world coordinate system at time points during the calibration travel of the vehicle, and removing the coordinates of the hitch ball in the world coordinate system satisfying a third coordinate removal condition when the coordinates of the hitch ball in the world coordinate system satisfying the third coordinate removal condition are included in the coordinates of the hitch ball in the world coordinate system at time points during the calibration travel of the vehicle; calculating the average value of the distance between the left lower end and the hitch ball in the world coordinate system or the average value of the distance between the right lower end and the hitch ball in the world coordinate system, an average value of an angle formed by the left lower end, the hitch ball and the right lower end in the world coordinate system, and an average value of the coordinates of the hitch ball in the world coordinate system, by using the coordinates of left lower end, the right lower end and the hitch ball in the world coordinate system at time points during the calibration travel of the vehicle which are not removed; and calculating the coordinate of the left lower end in the world coordinate system at a predetermined time point after the calibration travel of the vehicle and the coordinate of the right lower end in the world coordinate system at the predetermined time point, based on a hitch angle of the trailer at the predetermined time point, the average value of the distance between the left lower end and the hitch ball in the world coordinate system or the average value of the distance between the right lower end and the hitch ball in the world coordinate system, the average value of the angle formed by the left lower end, the hitch ball and the right lower end in the world coordinate system, and the average value of the coordinates of the hitch ball in the world coordinate system.

(5) Another aspect of the present disclosure is a non-transitory recording medium having recorded thereon a computer program for causing a processor to perform a process including: acquiring images shot by a camera mounted on a vehicle towing a trailer via a tow bar at time points during a calibration travel of the vehicle; calculating coordinates of left lower end of the trailer, right lower end of the trailer, and hitch ball on the images, the left lower end of the trailer, the right lower end of the trailer, and the hitch ball being included in each of the images; transforming the coordinates of the left lower end on the images to the coordinates of the left lower end in a world coordinate system, transforming the coordinates of the right lower end on the images to the coordinates of the right lower end in the world coordinate system, and transforming the coordinates of the hitch ball on the images to the coordinates of the hitch ball in the world coordinate system; calculating a first average value which is an average value of a distance between the left lower end and the hitch ball in the world coordinate system during the calibration travel of the vehicle based on the coordinates of the left lower end and the hitch ball in the world coordinate system at time points during the calibration travel of the vehicle, and calculating a second average value which is the average value of the distance between the right lower end and the hitch ball in the world coordinate system during the calibration travel of the vehicle based on the coordinates of the right lower end and the hitch ball in the world coordinate system at time points during the calibration travel of the vehicle; removing the coordinates of the left lower end in the world coordinate system satisfying a first coordinate removal condition when the coordinates of the left lower end in the world coordinate system satisfying the first coordinate removal condition are included in the coordinates of the left lower end in the world coordinate system at time points during the calibration travel of the vehicle, removing the coordinates of the right lower end in the world coordinate system satisfying a second coordinate removal condition when the coordinates of the right lower end in the world coordinate system satisfying the second coordinate removal condition are included in the coordinates of the right lower end in the world coordinate system at time points during the calibration travel of the vehicle, and removing the coordinates of the hitch ball in the world coordinate system satisfying a third coordinate removal condition when the coordinates of the hitch ball in the world coordinate system satisfying the third coordinate removal condition are included in the coordinates of the hitch ball in the world coordinate system at time points during the calibration travel of the vehicle; calculating the average value of the distance between the left lower end and the hitch ball in the world coordinate system or the average value of the distance between the right lower end and the hitch ball in the world coordinate system, an average value of an angle formed by the left lower end, the hitch ball and the right lower end in the world coordinate system, and an average value of the coordinates of the hitch ball in the world coordinate system, by using the coordinates of left lower end, the right lower end and the hitch ball in the world coordinate system at time points during the calibration travel of the vehicle which are not removed; and calculating the coordinate of the left lower end in the world coordinate system at a predetermined time point after the calibration travel of the vehicle and the coordinate of the right lower end in the world coordinate system at the predetermined time point, based on a hitch angle of the trailer at the predetermined time point, the average value of the distance between the left lower end and the hitch ball in the world coordinate system or the average value of the distance between the right lower end and the hitch ball in the world coordinate system, the average value of the angle formed by the left lower end, the hitch ball and the right lower end in the world coordinate system, and the average value of the coordinates of the hitch ball in the world coordinate system.

According to the present disclosure, it is possible to perform the driving assistance of the vehicle towing the trailer by presenting the coordinates of the left lower end and the right lower end of the trailer in the world coordinate system.

DESCRIPTION OF EMBODIMENTS

Figure 1:
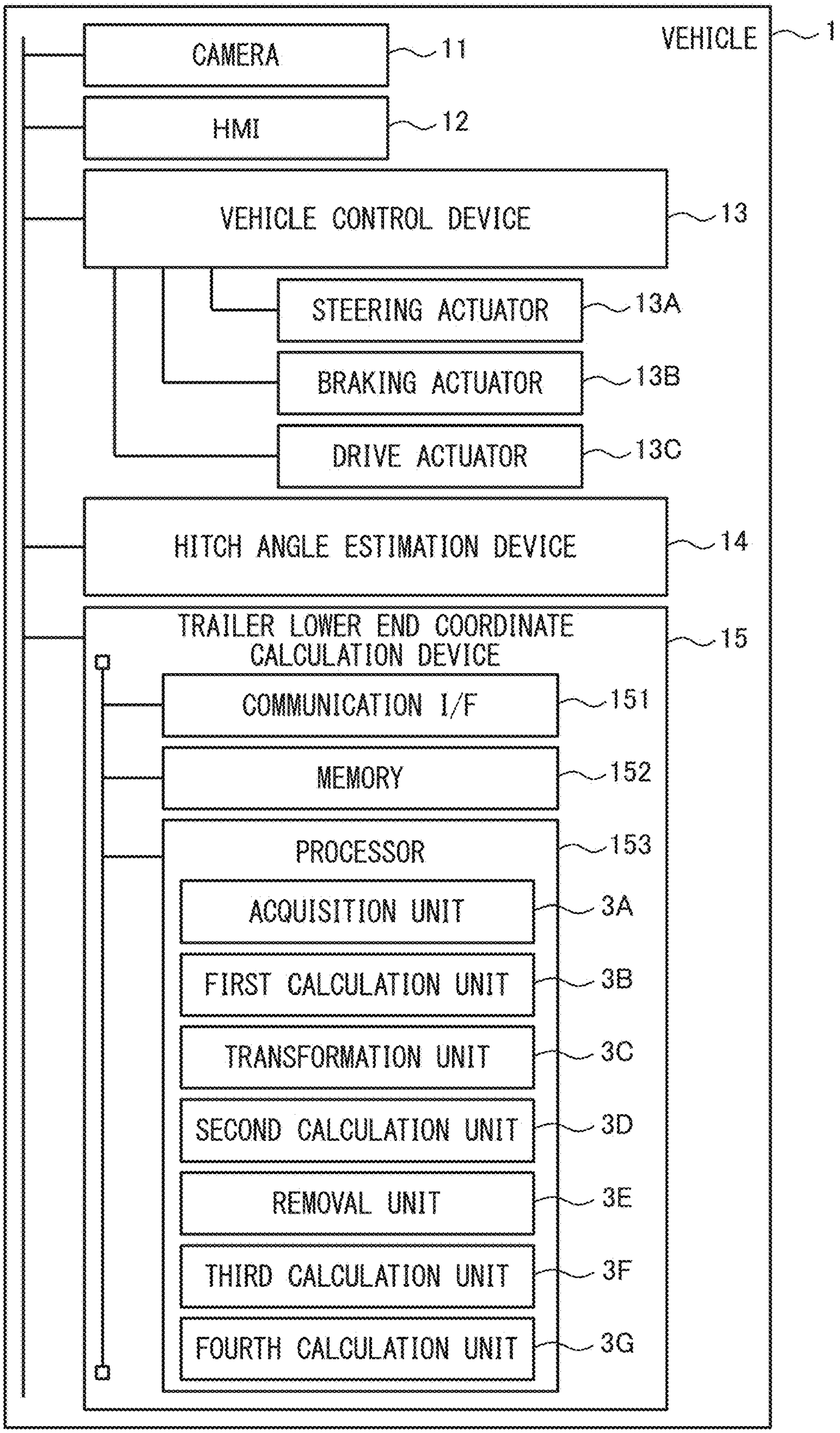
FIG. 1 is a view showing an example of a vehicle 1 to which a trailer lower end coordinate calculation device 15 of a first embodiment is applied.

Below, referring to the drawings, embodiments of trailer lower end coordinate calculation device, trailer lower end coordinate calculation method, and non-transitory recording medium of the present disclosure will be explained.

First Embodiment

Figure 2A:
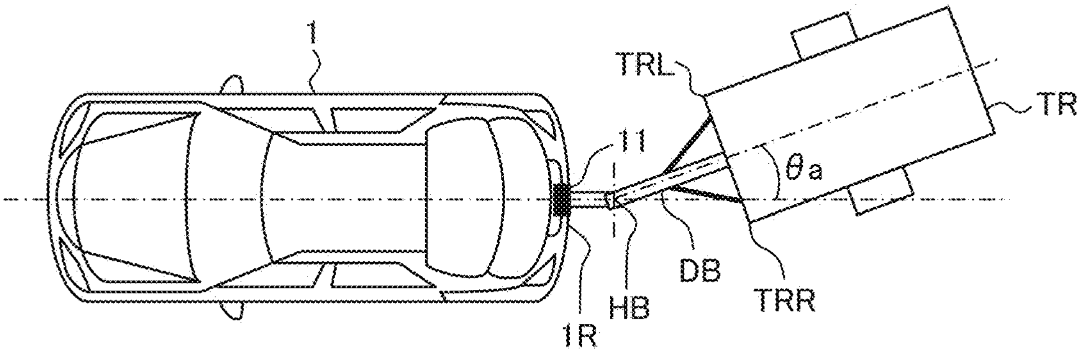
FIG. 2A is a view of the vehicle 1, trailer TR, and tow bar DB from above.
Figure 2B:
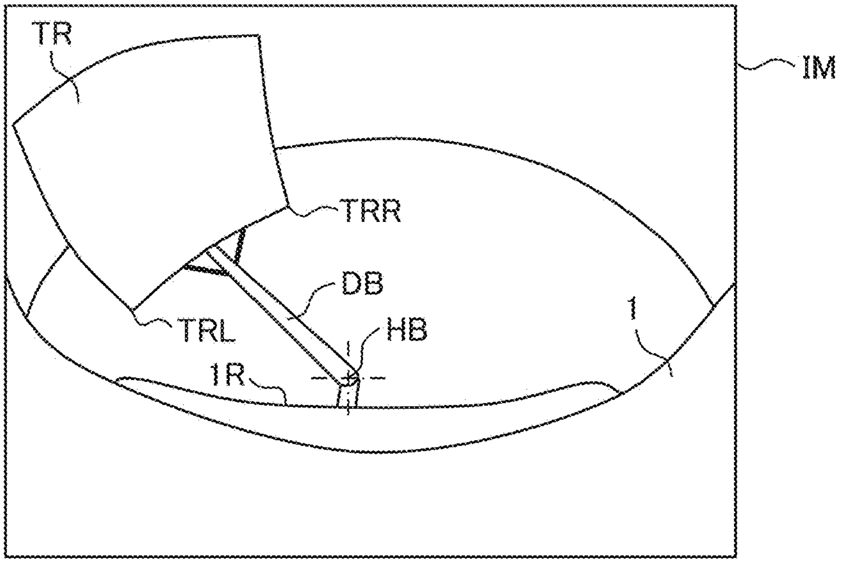
FIG. 2B is a view showing an example of an image IM including the trailer TR and the tow bar DB shot by a camera 11 mounted on the vehicle 1.
Figure 2C:
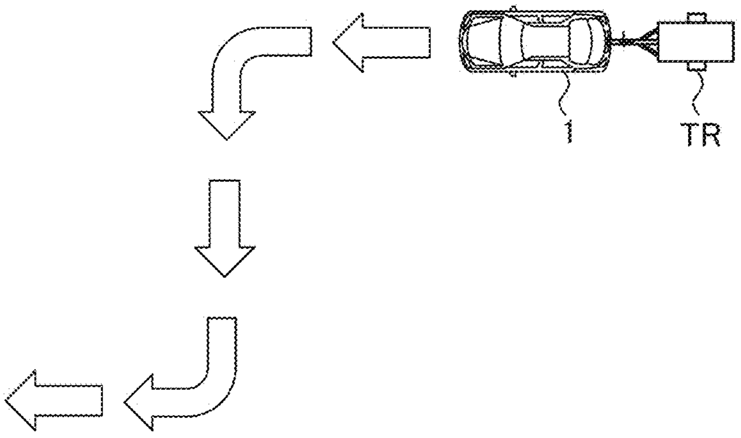
FIG. 2C is a view showing an example of a calibration travel of the vehicle 1.

FIG. 1 is a view showing an example of a vehicle 1 to which a trailer lower end coordinate calculation device 15 of a first embodiment is applied. FIG. 2A to FIG. 2C are views showing a relation between the vehicle 1 shown in FIG. 1, trailer TR and tow bar DB. Specifically, FIG. 2A is a view of the vehicle 1, the trailer TR, and the tow bar DB from above. FIG. 2B is a view showing an example of an image IM including the trailer TR and the tow bar DB shot by a camera 11 mounted on the vehicle 1. FIG. 2C is a view showing an example of a calibration travel of the vehicle 1. In the example shown in FIG. 1, FIG. 2A to FIG. 2C, the vehicle 1 tows the trailer TR via the tow bar DB. The vehicle 1 includes camera 11, HMI (Human Machine Interface) 12, vehicle control device 13, steering actuator 13A, braking actuator 13B, drive actuator 13C, hitch angle estimation device 14, and the trailer lower end coordinate calculation device 15. The camera 11 is disposed, for example, on a rear end portion IR of the vehicle 1. The camera 11 shoots the rear (right side of the FIG. 2A) of the vehicle 1 and transmits the image (e.g., fisheye lens image, etc.) IM (see FIG. 2B) including the trailer TR and the tow bar DB to the hitch angle estimation device 14 and the trailer lower end coordinate calculation device 16. As shown in FIG. 2A and FIG. 2B, the tow bar DB is fixed to the trailer TR, is connected to the vehicle 1, and can rotate about a hitch ball HB.

The HMI 12 has a function of receiving various operations of a driver of the vehicle 1, and transmits signals indicating the operations of the driver of the vehicle 1 to the vehicle control device 13. The vehicle control device 13 controls the steering actuator 13A, the braking actuator 13B, and the drive actuator 13C based on the signals and the like transmitted from the HMI 12.

The hitch angle estimation device 14 estimates a hitch angle θa (see FIG. 2A) of the trailer TR based on the image IM (see FIG. 2B) including the trailer TR and the tow bar DB shot by the camera 11. Specifically, the hitch angle estimation device 14 estimates the hitch angle θa of the trailer TR based on the image IM including the trailer TR and the tow bar DB shot by the camera 11 by using a model obtained by performing learning using teacher data which is a data set of a learning image shot by a learning camera (not shown) mounted on a learning vehicle (not shown) towing a learning trailer (not shown) via a learning tow bar (not shown) and a label indicating the hitch angle of the learning trailer included in the learning image.

The trailer lower end coordinate calculation device 15 is configured by a microcomputer including communication interface (I/F) 151, memory 152 and processor 153. The communication interface 151 has an interface circuit for connecting the trailer lower end coordinate calculation device 15 to the camera 11, the HMI 12, the vehicle control device 13 and the hitch angle estimation device 14. The memory 152 stores a program used in a process performed by the processor 153 and various data. The processor 153 has a function as an acquisition unit 3A, function as a first calculation unit 3B, function as a transformation unit 3C, function as a second calculation unit 3D, function as a removal unit 3E, function as a third calculation unit 3F, and function as a fourth calculation unit 3G. The acquisition unit 3A acquires the image IM including the trailer TR and the tow bar DB shot by the camera 11. Specifically, the acquisition unit 3A acquires a plurality of images IM, . . . shot by the camera 11 at time points during the calibration travel of the vehicle 1. The acquisition unit 3A acquires the hitch angle θa of the trailer TR at a predetermined time after the calibration travel of the vehicle 1 estimated by the hitch angle estimation device 14. The first calculation unit 3B calculates coordinates of left lower end TRL (see FIG. 2B) of the trailer TR, right lower end TRR (see FIG. 2B) of the trailer TR, and hitch ball HB (see FIG. 2B) on the images. The left lower end TRL of the trailer TR, the right lower end TRR of the trailer TR, and the hitch ball HB are included in each of the plurality of images IM, . . . acquired by the acquisition unit 3A.

The transformation unit 3C transforms the coordinates of the left lower end TRL of the trailer TR on the images calculate by the first calculation unit 3B to the coordinates of the left lower end TRL of the trailer TR in a world coordinate system, for example, by using a known technique called a coordinate transformation or the like. The transformation unit 3C transforms the coordinates of the right lower end TRR of the trailer TR on the images calculated by the first calculation unit 3B to the coordinates of the right lower end TRR of the trailer TR in the world coordinate system. Furthermore, the transformation unit 3C transforms the coordinates of the hitch ball HB on the images calculated by the first calculation unit 3B to the coordinates of the hitch ball HB in the world coordinate system. Specifically, the transformation unit 3C transforms the coordinate of the left lower end TRL of the trailer TR on the image IM shown in the FIG. 2B to the coordinate of the left lower end TRL of the trailer TR in the world coordinate system shown in FIG. 3A, transforms the coordinate of the right lower end TRR of the trailer TR on the image IM shown in the FIG. 2B to the coordinate of the right lower end TRR of the trailer TR in the world coordinate system shown in the FIG. 3A, and transforms the coordinate of the hitch ball HB on the image IM shown in FIG. 2B to the coordinate of the hitch ball HB in the world coordinate system shown in the FIG. 3A.

Figure 3A:
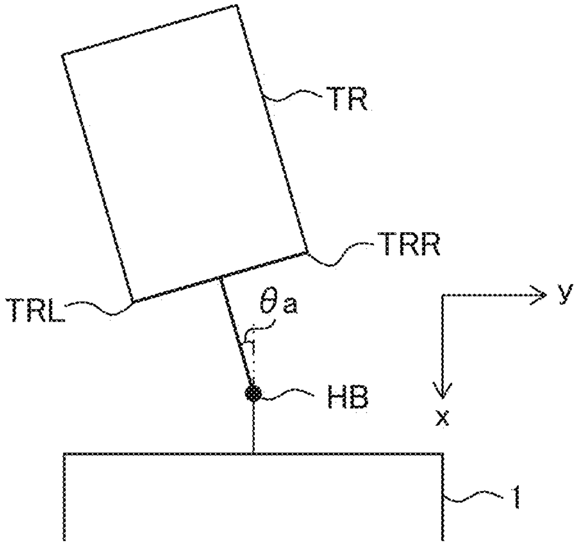
FIG. 3A is a view showing an example of a transformation from coordinates on the image IM shown in FIG. 2B to coordinates in a world coordinate system.
Figure 3B:
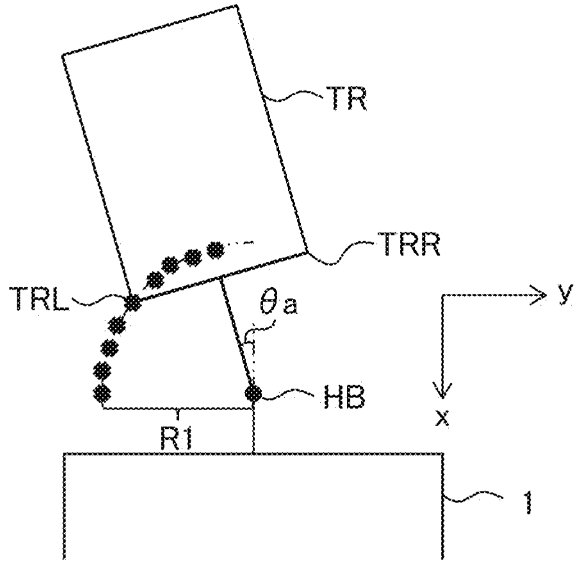
FIG. 3B is a view showing an example of an average value (first average value) R1 of distance between left lower end TRL of the trailer TR and hitch ball HB in the world coordinate system during the calibration travel of the vehicle 1 calculated by a second calculation unit 3D.
Figure 3C:
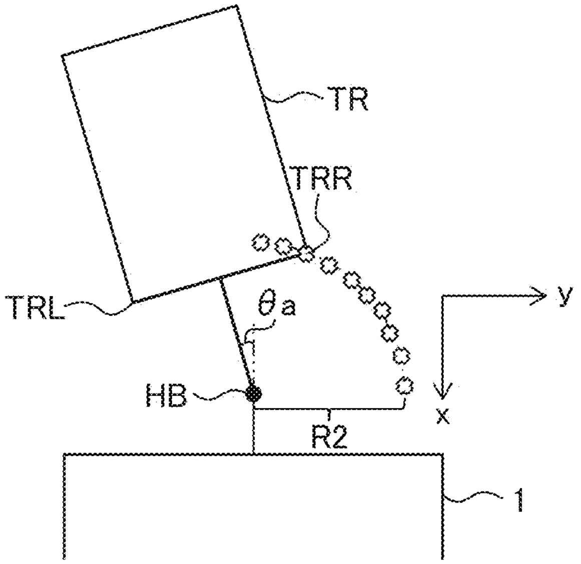
FIG. 3C is a view showing an example of the average value (second average value) R2 of the distance between right lower end TRR of the trailer TR and the hitch ball HB in the world coordinate system during the calibration travel of the vehicle 1 calculated by the second calculation unit 3D.

FIG. 3A to FIG. 3C are views showing an example of a transformation from the coordinates on the image IM shown in FIG. 2B to the coordinates in the world coordinate system and the like. Specifically, FIG. 3A is a view showing an example of the transformation from the coordinates on the image IM shown in FIG. 2B to coordinates in the world coordinate system. FIG. 3B is a view showing an example of an average value (first average value) R1 of distance between left lower end TRL of the trailer TR and hitch ball HB in the world coordinate system during the calibration travel of the vehicle 1 calculated by the second calculation unit 3D. FIG. 3C is a view showing an example of the average value (second average value) R2 of the distance between right lower end TRR of the trailer TR and the hitch ball HB in the world coordinate system during the calibration travel of the vehicle 1 calculated by the second calculation unit 3D.

In the example shown in FIG. 1 to FIG. 3C, the second calculation unit 3D calculates the average value (first average value) R1 (see FIG. 3B) of the distance between the left lower end TRL of the trailer TR and the hitch ball HB in the world coordinate system during the calibration travel of the vehicle 1 based on the coordinates of the left lower end TRL of the trailer TR and the hitch ball HB in the world coordinate system at a plurality of time points during the calibration travel of the vehicle 1. The second calculation unit 3D calculates the average value (second average value) R2 (see FIG. 3C) of the distance between the right lower end TRR of the trailer TR and the hitch ball HB in the world coordinate system during the calibration travel of the vehicle 1 based on the coordinates of the right lower end TRR of the trailer TR and the hitch ball HB in the world coordinate system at the plurality of time points during the calibration travel of the vehicle 1.

The plurality of image IM, . . . shot by the camera 11 at the plurality of time points during the calibration travel of the vehicle 1 may include an image shot by the camera 11 when condition for image recognition is bad (e.g., during bad weather, at night, when the vehicle 1 is traveling on a highway with a large gradient, etc.). In view of this point, in the example shown in FIG. 1 to FIG. 3C, the removal unit 3E removes the coordinates of the left lower end TRL of the trailer TR in the world coordinate system satisfying a first coordinate removal condition when the coordinates of the left lower end TRL of the trailer TR in the world coordinate system satisfying the first coordinate removal condition are included in the coordinates of the left lower end TRL of the trailer TR in the world coordinate system at the plurality of time points during the calibration travel of the vehicle 1. Specifically, when the coordinates of the left lower end TRL of the trailer TR in the world coordinate system during the calibration travel of the vehicle 1 are located outside of a predetermined first area AR1 (see FIG. 4A), the removal unit 3E determines that the first coordinate removal condition is satisfied, and removes the coordinates of the left lower end TRL of the trailer TR in the world coordinate system at time points when the coordinates of the left lower end TRL of the trailer TR in the world coordinate system are located outside of the first area AR1. The removal unit 3E calculates a standard deviation (first standard deviation) of a difference between the distance between the left lower end TRL of the trailer TR and the hitch ball HB in the world coordinate system during the calibration travel of the vehicle 1 and the first average value R1 (see FIG. 3B). Furthermore, when the difference between the distance between the left lower end TRL of the trailer TR and the hitch ball HB in the world coordinate system during the calibration travel of the vehicle 1 and the first average value R1 is more than twice as large as the first standard deviation, the removal unit 3E determines that the first coordinate removal condition is satisfied, and removes the coordinates of the left lower end TRL of the trailer TR in the world coordinate system at time points when the difference between the distance between the left lower end TRL of the trailer TR and the hitch ball HB in the world coordinate system and the first average value R1 is more than twice as large as the first standard deviation.

The removal unit 3E removes the coordinates of the right lower end TRR of the trailer TR in the world coordinate system satisfying a second coordinate removal condition when the coordinates of the right lower end TRR of the trailer TR in the world coordinate system satisfying the second coordinate removal condition are included in the coordinates of the right lower end TRR of the trailer TR in the world coordinate system at the plurality of time points during the calibration travel of the vehicle 1. Specifically, when the coordinates of the right lower end TRR of the trailer TR in the world coordinate system during the calibration travel of the vehicle 1 are located outside of the first area AR1 (see FIG. 4A), the removal unit 3E determines that the second coordinate removal condition is satisfied, and removes the coordinates of the right lower end TRR of the trailer TR in the world coordinate system at time points when the coordinates of the right lower end TRR of the trailer TR in the world coordinate system are located outside of the first area AR1. The removal unit 3E calculates the standard deviation (second standard deviation) of the difference between the distance between the right lower end TRR of the trailer TR and the hitch ball HB in the world coordinate system during the calibration travel of the vehicle 1 and the second average value R2 (see FIG. 3C). Furthermore, when the difference between the distance between the right lower end TRR of the trailer TR and the hitch ball HB in the world coordinate system during the calibration travel of the vehicle 1 and the second average value R2 is more than twice as large as the second standard deviation, the removal unit 3E determines that the second coordinate removal condition is satisfied, and removes the coordinates of the right lower end TRR of the trailer TR in the world coordinate system at time points when the difference between the distance between the right lower end TRR of the trailer TR and the hitch ball HB in the world coordinate system and the second average value R2 is more than twice as large as the second standard deviation.

Furthermore, the removal unit 3E removes the coordinates of the hitch ball HB in the world coordinate system satisfying a third coordinate removal condition when the coordinates of the hitch ball HB in the world coordinate system satisfying the third coordinate removal condition are included in the coordinates of the hitch ball HB in the world coordinate system at the plurality of time points during the calibration travel of the vehicle 1. Specifically, when the coordinates of the hitch ball HB in the world coordinate system during the calibration travel of the vehicle 1 are located outside of a predetermined second area AR2 (see FIG. 4B), the removal unit 3E determines that the third coordinate removal condition is satisfied, and removes the coordinates of the hitch ball HB in the world coordinate system at time points when the coordinates of the hitch ball HB in the world coordinate system are located outside of the second area AR2.

Figure 4A:
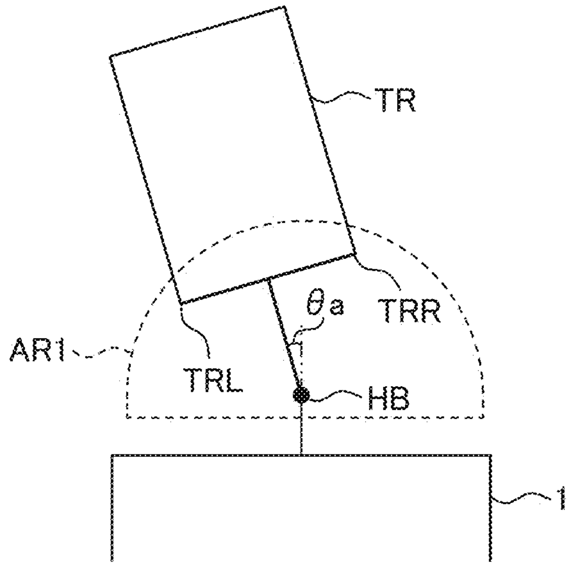
FIG. 4A is a view showing an example of a first area AR1.
Figure 4B:
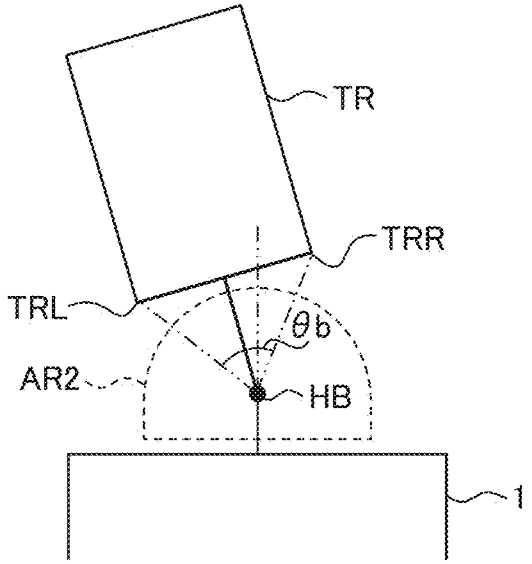
FIG. 4B is a view showing an example of a second area AR2.

FIG. 4A and FIG. 4B are views showing an example of the first area AR1 and the like. Specifically, FIG. 4A shows the example of the first area AR1, FIG. 4B shows an example of the second area AR2.

In the example shown in FIG. 1 to FIG. 4B, the third calculation unit 3F calculates a radius after learning R which is the average value (first average value) R1 of the distance between the left lower end TRL of the trailer TR and the hitch ball HB in the world coordinate system at the plurality of time points during the calibration travel of the vehicle 1 or the average value (second average value) R2 of the distance between the right lower end TRR of the trailer TR and the hitch ball HB in the world coordinate system at the plurality of time points during the calibration travel of the vehicle 1, by using the coordinates of left lower end TRL of the trailer TR, the right lower end TRR of the trailer TR and the hitch ball HB in the world coordinate system at the plurality of time points during the calibration travel of the vehicle 1 which are not removed by the removal unit 3E. The third calculation unit 3F calculates average value θbav (see FIG. 5) of an angle θb (see FIG. 4B) formed by the left lower end TRL of the trailer TR, the hitch ball HB and the right lower end TRR of the trailer TR in the world coordinate system at the plurality of time points during the calibration travel of the vehicle 1, and average value (xh,yh) of the coordinates of the hitch ball HB in the world coordinate system at the plurality of time points during the calibration travel of the vehicle 1, by using the coordinates of left lower end TRL of the trailer TR, the right lower end TRR of the trailer TR and the hitch ball HB in the world coordinate system at the plurality of time points during the calibration travel of the vehicle 1 which are not removed by the removal unit 3E.

The fourth calculation unit 3G calculates the coordinate (xl,yl) (see FIG. 5) of the left lower end TRL of the trailer TR in the world coordinate system at a predetermined time point after the calibration travel of the vehicle 1 and the coordinate (xr,yr) (see FIG. 5) of the right lower end TRR of the trailer TR in the world coordinate system at the predetermined time point after the calibration travel of the vehicle 1, based on the hitch angle θa (see FIG. 4A and FIG. 5) of the trailer TR at the predetermined time point after the calibration travel of the vehicle 1 estimated by the hitch angle estimation device 14, the radius after learning R (see FIG. 5) (first average value R1 or second average value R2) calculated by the third calculation unit 3F, the average value θbav (see FIG. 5) of the angle θb formed by the left lower end TRL of the trailer TR, the hitch ball HB and the right lower end TRR of the trailer TR in the world coordinate system at the plurality of time points during the calibration travel of the vehicle 1 calculated by the third calculation unit 3F, the average value (xh,yh) (see FIG. 5) of the coordinates of the hitch ball HB in the world coordinate system at the plurality of time points during the calibration travel of the vehicle 1 calculated by the third calculation unit 3F, and Equations (1) and (2) below.

$$(xl, yl) = (R \times \cos\theta l + xh, R \times \sin\theta l + yh) \quad (1)$$

$$(xr, yr) = (R \times \cos\theta r + xh, R \times \sin\theta r + yh) \quad (2)$$

In Equation (1), θl=180+θa+ (θbav/2), in Equation (2), θr=180+θa−(θbav/2).

Figure 5:
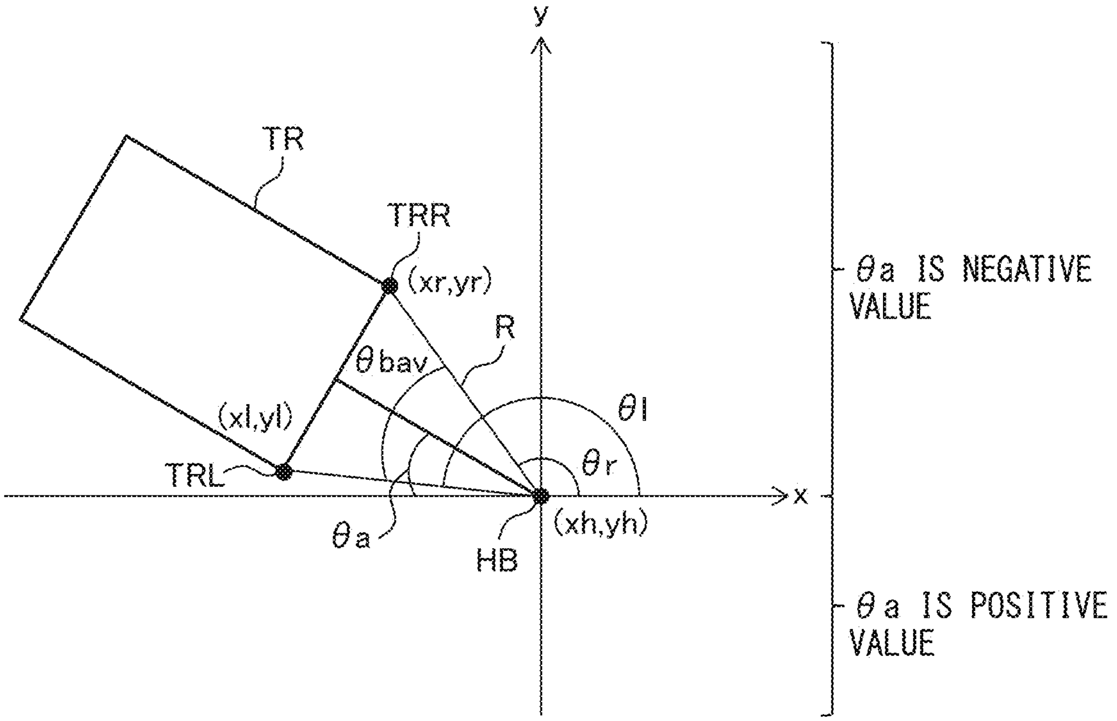
FIG. 5 is a view for explaining the coordinate (xl,yl) of the left lower end TRL of the trailer TR in the world coordinate system and the coordinate (xr,yr) of the right lower end TRR of the trailer TR in the world coordinate system at a predetermined time point calculated by a fourth calculation unit 3G.

FIG. 5 is a view for explaining the coordinate (xl,yl) of the left lower end TRL of the trailer TR in the world coordinate system and the coordinate (xr,yr) of the right lower end TRR of the trailer TR in the world coordinate system at the predetermined time point calculated by the fourth calculation unit 3G.

As described above, in the example shown in FIG. 1 to FIG. 5, the coordinates of the left lower end TRL of the trailer TR, the right lower end TRR of the trailer TR, and the hitch ball HB in the world coordinate system, which are calculated by the first calculation unit 3B based on the images shot by the camera 11 when the condition for the image recognition is bad during the calibration travel of the vehicle 1, and are transformed by the transformation unit 3C, are removed by the removal unit 3E. Furthermore, the coordinates (xr,yr) of the left lower end TRL of the trailer TR in the world coordinate system and the coordinates (xl,yl) of the right lower end TRR of the trailer TR in the world coordinate system at the predetermined time after the calibration travel of the vehicle 1 are calculated by the fourth calculation unit 3G based on the coordinates of the left lower end TRL of the trailer TR, the right lower end TRR of the trailer TR, and the hitch ball HB in the world coordinate system during the calibration travel of the vehicle 1 which are not removed. Therefore, in the example shown in FIG. 1 to FIG. 5, even if the time when the condition for the image recognition is bad is included during the calibration travel of the vehicle 1, it is possible to appropriately calculate the coordinates (xr,yr) of the left lower end TRL of the trailer TR in the world coordinate system and the coordinates (xl,yl) of the right lower end TRR of the trailer TR in the world coordinate system at the predetermined time after the calibration travel of the vehicle 1.

Figure 6:
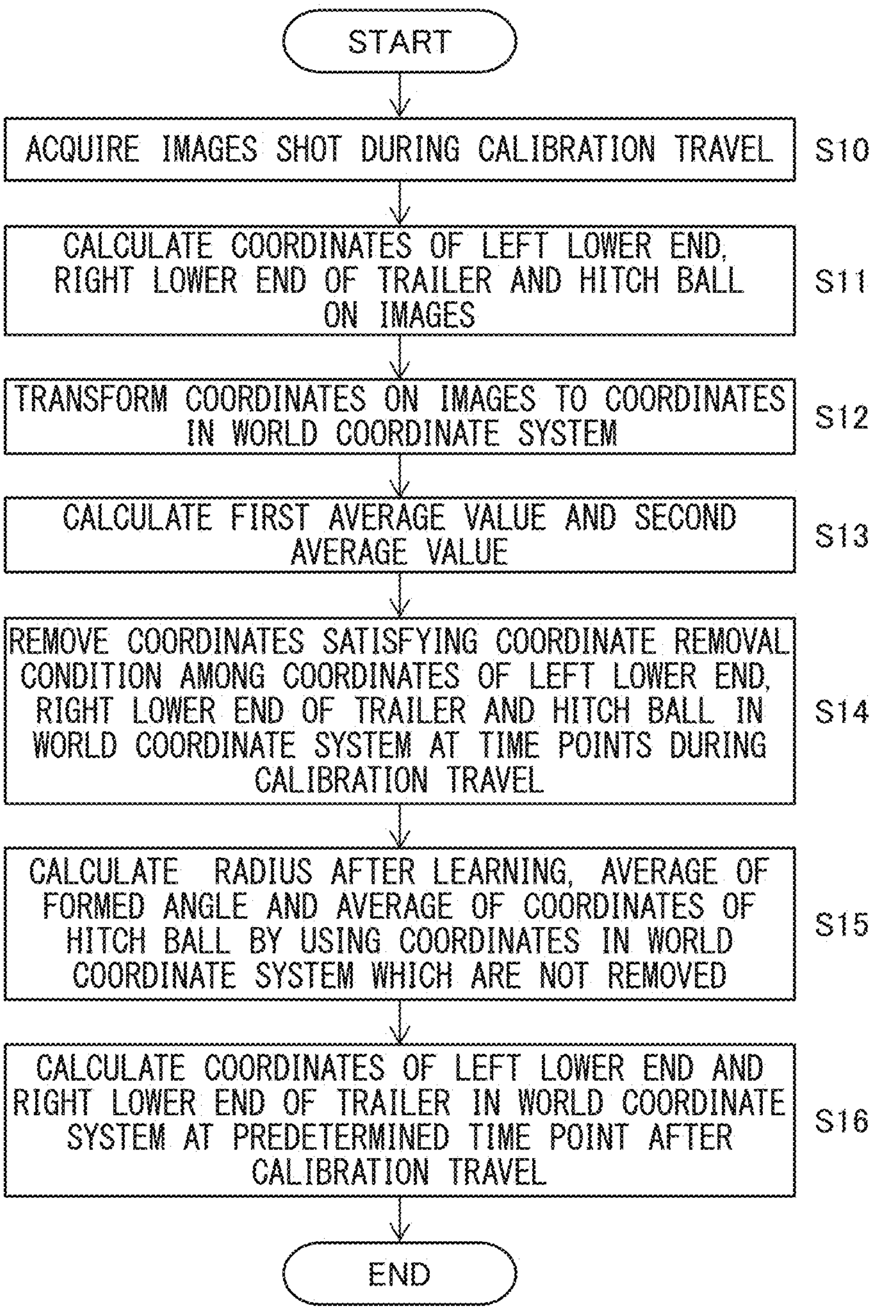
FIG. 6 is a flowchart for explaining an example of a process performed by a processor 153 of the trailer lower end coordinate calculation device 15 of the first embodiment.

FIG. 6 is a flowchart for explaining an example of the process performed by the processor 153 of the trailer lower end coordinate calculation device 15 of the first embodiment.

In the example shown in FIG. 6, at step S10, the acquisition unit 3A acquires the plurality of images IM, . . . shot by the camera 11 at the plurality of time points during the calibration travel of the vehicle 1.

At step S11, the first calculation unit 3B calculates the coordinates of left lower end TRL (see FIG. 2B) of the trailer TR, right lower end TRR (see FIG. 2B) of the trailer TR, and hitch ball HB (see FIG. 2B) on the images IM, . . . . The left lower end TRL of the trailer TR, the right lower end TRR of the trailer TR, and the hitch ball HB are included in each of the plurality of images IM, . . . acquired at step S10.

At step S12, the transformation unit 3C transforms the coordinates of the left lower end TRL of the trailer TR, the right lower end TRR of the trailer TR and the hitch ball HB on the images IM, . . . calculated at step S11 to the coordinates of the left lower end TRL of the trailer TR, the right lower end TRR of the trailer TR and the hitch ball HB in the world coordinate system.

At step S13, the second calculation unit 3D calculates the average value (first average value) R1 of the distance between the left lower end TRL of the trailer TR and the hitch ball HB in the world coordinate system and the average value (second average value) R2 of the distance between the right lower end TRR of the trailer TR and the hitch ball HB in the world coordinate system at the plurality of time points during the calibration travel of the vehicle 1 based on the coordinates in the world coordinate system transformed at step S12.

At step S14, the removal unit 3E removes the coordinates satisfying the coordinate removal conditions (first coordinate removal condition, second coordinate removal condition or third coordinate removal condition) among the coordinates of the left lower end TRL of the trailer TR, the right lower end TRR of the trailer TR, and the hitch ball HB in the world coordinate system at the plurality of time points during the calibration travel of the vehicle 1.

Specifically, in the example shown in FIG. 6, after step S14, the processor 153 determines whether the learning using the plurality of images IM, . . . shot during the calibration travel of the vehicle 1 is successful based on the number of the coordinates of the left lower end TRL of the trailer TR in the world coordinate system during the calibration travel of the vehicle 1 which are not removed at step S14, the number of the coordinates of the right lower end TRR of the trailer TR in the world coordinate system during the calibration travel of the vehicle 1 which are not removed at step S14, the number of the coordinates of the hitch ball HB in the world coordinate system during the calibration travel of the vehicle 1 which are not removed at step S14, and the first standard deviation and the second standard deviation calculated by the removal unit 3E. When the learning is successful, it proceeds to step S15, and when the learning is not successful, it returns to step S11.

At step S15, the third calculation unit 3F calculates the radius after learning R (first average value R1 or second average value R2), the average value θbav of the formed angle θb, the average value (xh,yh) of the coordinates of the hitch ball HB in the world coordinate system, by using the coordinates of the left lower end TRL of the trailer TR, the right lower end TRR of the trailer TR and the hitch ball HB in the world coordinate system at the plurality of time points during the calibration travel of the vehicle 1 which are not removed at step S14.

At step S16, the fourth calculation unit 3G calculates the coordinate (xl,yl) of the left lower end TRL of the trailer TR in the world coordinate system at the predetermined time point after the calibration travel of the vehicle 1 and the coordinate (xr,yr) of the right lower end TRR of the trailer TR in the world coordinate system at the predetermined time point after the calibration travel of the vehicle 1, based on the hitch angle θa of the trailer TR at the predetermined time point after the calibration travel of the vehicle 1, the radius after learning R (first average value R1 or second average value R2), the average value θbav of the formed angle θb, the average value (xh,yh) of the coordinates of the hitch ball HB in the world coordinate system, and Equations (1) and (2) described above.

Second Embodiment

The vehicle 1 to which the trailer lower end coordinate calculation device 15 of a second embodiment is applied is configured similarly to the vehicle 1 to which the trailer lower end coordinate calculation device 15 of the first embodiment is applied as described above, except that it will be described later.

In the vehicle 1 to which the trailer lower end coordinate calculation device 15 of the first embodiment is applied as described above, the transformation unit 3C performs transformation from the coordinates on the images IM, . . . to the coordinates in the world coordinate system by using the known technique.

On the other hand, in the vehicle 1 to which the trailer lower end coordinate calculation device 15 of the second embodiment is applied, the transformation unit 3C performs the transformation from the coordinates on the images IM, . . . to the coordinates in the world coordinate system by using a technique (for example, technique peculiar to a manufacturer of the vehicle 1 or the like) other than the known technique.

As described above, although the embodiments of the trailer lower end coordinate calculation device, the trailer lower end coordinate calculation method, and the non-transitory recording medium of the present disclosure have been described with reference to the drawings, the trailer lower end coordinate calculation device, the trailer lower end coordinate calculation method, and the non-transitory recording medium of the present disclosure are not limited to the embodiments described above, and may be appropriately changed without departing from the scope of the present disclosure. The configuration of each example of the embodiment described above may be appropriately combined. In each example of the above-described embodiment, the process performed in the trailer lower end coordinate calculation device 15 has been described as software process performed by executing the program, but the process performed in the trailer lower end coordinate calculation device 15 may be process performed by hardware. Alternatively, the process performed by the trailer lower end coordinate calculation device 15 may be a combination of both software and hardware. Further, the program (program for realizing the function of the processor 153 of the trailer lower end coordinate calculation device 15) stored in the memory 152 of the trailer lower end coordinate calculation device 15 may be recorded in a computer-readable storage medium (non-transitory recording medium) such as, semiconductor memory, magnetic recording medium, optical recording medium, or the like for providing, distribution or the like.

The invention claimed is:

1. A trailer lower end coordinate calculation device comprising a processor configured to:

acquire images shot by a camera mounted on a vehicle towing a trailer via a tow bar at time points during a calibration travel of the vehicle;

calculate coordinates of left lower end of the trailer, right lower end of the trailer, and hitch ball on the images, the left lower end of the trailer, the right lower end of the trailer, and the hitch ball being included in each of the images;

transform the coordinates of the left lower end on the images to the coordinates of the left lower end in a world coordinate system, transform the coordinates of the right lower end on the images to the coordinates of the right lower end in the world coordinate system, and transform the coordinates of the hitch ball on the images to the coordinates of the hitch ball in the world coordinate system;

calculate a first average value which is an average value of a distance between the left lower end and the hitch ball in the world coordinate system during the calibration travel of the vehicle based on the coordinates of the left lower end and the hitch ball in the world coordinate system at time points during the calibration travel of the vehicle, and calculate a second average value which is the average value of the distance between the right lower end and the hitch ball in the world coordinate system during the calibration travel of the vehicle based on the coordinates of the right lower end and the hitch ball in the world coordinate system at time points during the calibration travel of the vehicle;

remove the coordinates of the left lower end in the world coordinate system satisfying a first coordinate removal condition when the coordinates of the left lower end in the world coordinate system satisfying the first coordinate removal condition are included in the coordinates of the left lower end in the world coordinate system at time points during the calibration travel of the vehicle, remove the coordinates of the right lower end in the world coordinate system satisfying a second coordinate removal condition when the coordinates of the right lower end in the world coordinate system satisfying the second coordinate removal condition are included in the coordinates of the right lower end in the world coordinate system at time points during the calibration travel of the vehicle, and remove the coordinates of the hitch ball in the world coordinate system satisfying a third coordinate removal condition when the coordinates of the hitch ball in the world coordinate system satisfying the third coordinate removal condition are included in the coordinates of the hitch ball in the world coordinate system at time points during the calibration travel of the vehicle;

calculate the average value of the distance between the left lower end and the hitch ball in the world coordinate system or the average value of the distance between the right lower end and the hitch ball in the world coordinate system, an average value of an angle formed by the left lower end, the hitch ball and the right lower end in the world coordinate system, and an average value of the coordinates of the hitch ball in the world coordinate system, by using the coordinates of left lower end, the right lower end and the hitch ball in the world coordinate system at time points during the calibration travel of the vehicle which are not removed; and calculate the coordinate of the left lower end in the world coordinate system at a predetermined time point after the calibration travel of the vehicle and the coordinate of the right lower end in the world coordinate system at the predetermined time point, based on a hitch angle of the trailer at the predetermined time point, the average value of the distance between the left lower end and the hitch ball in the world coordinate system or the average value of the distance between the right lower end and the hitch ball in the world coordinate system, the average value of the angle formed by the left lower end, the hitch ball and the right lower end in the world coordinate system, and the average value of the coordinates of the hitch ball in the world coordinate system.

2. The trailer lower end coordinate calculation device according to claim 1, wherein the processor is configured to:

determine that the first coordinate removal condition is satisfied when the coordinates of the left lower end in the world coordinate system during the calibration travel of the vehicle are located outside of a predetermined first area, and remove the coordinates of the left lower end in the world coordinate system at time points when the coordinates of the left lower end in the world coordinate system are located outside of the first area;

determine that the second coordinate removal condition is satisfied when the coordinates of the right lower end in the world coordinate system during the calibration travel of the vehicle are located outside of the first area, and remove the coordinates of the right lower end in the world coordinate system at time points when the coordinates of the right lower end in the world coordinate system are located outside of the first area; and determine that the third coordinate removal condition is satisfied when the coordinates of the hitch ball in the world coordinate system during the calibration travel of the vehicle are located outside of a predetermined second area, and remove the coordinates of the hitch ball in the world coordinate system at time points when the coordinates of the hitch ball in the world coordinate system are located outside of the second area.

3. The trailer lower end coordinate calculation device according to claim 1, wherein the processor is configured to:

calculate a first standard deviation which is a standard deviation of a difference between the distance between the left lower end and the hitch ball in the world coordinate system during the calibration travel of the vehicle and the first average value;

determine that the first coordinate removal condition is satisfied when the difference between the distance between the left lower end and the hitch ball in the world coordinate system during the calibration travel of the vehicle and the first average value is more than twice as large as the first standard deviation, and remove the coordinates of the left lower end in the world coordinate system at time points when the difference between the distance between the left lower end and the hitch ball in the world coordinate system and the first average value is more than twice as large as the first standard deviation;

calculate a second standard deviation which is the standard deviation of the difference between the distance between the right lower end and the hitch ball in the world coordinate system during the calibration travel of the vehicle and the second average value; and determine that the second coordinate removal condition is satisfied when the difference between the distance between the right lower end and the hitch ball in the world coordinate system during the calibration travel of the vehicle and the second average value is more than twice as large as the second standard deviation, and remove the coordinates of the right lower end in the world coordinate system at time points when the difference between the distance between the right lower end and the hitch ball in the world coordinate system and the second average value is more than twice as large as the second standard deviation.

4. A trailer lower end coordinate calculation method comprising:

acquiring images shot by a camera mounted on a vehicle towing a trailer via a tow bar at time points during a calibration travel of the vehicle;

calculating coordinates of left lower end of the trailer, right lower end of the trailer, and hitch ball on the images, the left lower end of the trailer, the right lower end of the trailer, and the hitch ball being included in each of the images;

transforming the coordinates of the left lower end on the images to the coordinates of the left lower end in a world coordinate system, transforming the coordinates of the right lower end on the images to the coordinates of the right lower end in the world coordinate system, and transforming the coordinates of the hitch ball on the images to the coordinates of the hitch ball in the world coordinate system;

calculating a first average value which is an average value of a distance between the left lower end and the hitch ball in the world coordinate system during the calibration travel of the vehicle based on the coordinates of the left lower end and the hitch ball in the world coordinate system at time points during the calibration travel of the vehicle, and calculating a second average value which is the average value of the distance between the right lower end and the hitch ball in the world coordinate system during the calibration travel of the vehicle based on the coordinates of the right lower end and the hitch ball in the world coordinate system at time points during the calibration travel of the vehicle;

removing the coordinates of the left lower end in the world coordinate system satisfying a first coordinate removal condition when the coordinates of the left lower end in the world coordinate system satisfying the first coordinate removal condition are included in the coordinates of the left lower end in the world coordinate system at time points during the calibration travel of the vehicle, removing the coordinates of the right lower end in the world coordinate system satisfying a second coordinate removal condition when the coordinates of the right lower end in the world coordinate system satisfying the second coordinate removal condition are included in the coordinates of the right lower end in the world coordinate system at time points during the calibration travel of the vehicle, and removing the coordinates of the hitch ball in the world coordinate system satisfying a third coordinate removal condition when the coordinates of the hitch ball in the world coordinate system satisfying the third coordinate removal condition are included in the coordinates of the hitch ball in the world coordinate system at time points during the calibration travel of the vehicle;

calculating the average value of the distance between the left lower end and the hitch ball in the world coordinate system or the average value of the distance between the right lower end and the hitch ball in the world coordinate system, an average value of an angle formed by the left lower end, the hitch ball and the right lower end in the world coordinate system, and an average value of the coordinates of the hitch ball in the world coordinate system, by using the coordinates of left lower end, the right lower end and the hitch ball in the world coordinate system at time points during the calibration travel of the vehicle which are not removed; and calculating the coordinate of the left lower end in the world coordinate system at a predetermined time point after the calibration travel of the vehicle and the coordinate of the right lower end in the world coordinate system at the predetermined time point, based on a hitch angle of the trailer at the predetermined time point, the average value of the distance between the left lower end and the hitch ball in the world coordinate system or the average value of the distance between the right lower end and the hitch ball in the world coordinate system, the average value of the angle formed by the left lower end, the hitch ball and the right lower end in the world coordinate system, and the average value of the coordinates of the hitch ball in the world coordinate system.

5. A non-transitory recording medium having recorded thereon a computer program for causing a processor to perform a process comprising:

acquiring images shot by a camera mounted on a vehicle towing a trailer via a tow bar at time points during a calibration travel of the vehicle;

calculating coordinates of left lower end of the trailer, right lower end of the trailer, and hitch ball on the images, the left lower end of the trailer, the right lower end of the trailer, and the hitch ball being included in each of the images;

transforming the coordinates of the left lower end on the images to the coordinates of the left lower end in a world coordinate system, transforming the coordinates of the right lower end on the images to the coordinates of the right lower end in the world coordinate system, and transforming the coordinates of the hitch ball on the images to the coordinates of the hitch ball in the world coordinate system;

calculating a first average value which is an average value of a distance between the left lower end and the hitch ball in the world coordinate system during the calibration travel of the vehicle based on the coordinates of the left lower end and the hitch ball in the world coordinate system at time points during the calibration travel of the vehicle, and calculating a second average value which is the average value of the distance between the right lower end and the hitch ball in the world coordinate system during the calibration travel of the vehicle based on the coordinates of the right lower end and the hitch ball in the world coordinate system at time points during the calibration travel of the vehicle;

removing the coordinates of the left lower end in the world coordinate system satisfying a first coordinate removal condition when the coordinates of the left lower end in the world coordinate system satisfying the first coordinate removal condition are included in the coordinates of the left lower end in the world coordinate system at time points during the calibration travel of the vehicle, removing the coordinates of the right lower end in the world coordinate system satisfying a second coordinate removal condition when the coordinates of the right lower end in the world coordinate system satisfying the second coordinate removal condition are included in the coordinates of the right lower end in the world coordinate system at time points during the calibration travel of the vehicle, and removing the coordinates of the hitch ball in the world coordinate system satisfying a third coordinate removal condition when the coordinates of the hitch ball in the world coordinate system satisfying the third coordinate removal condition are included in the coordinates of the hitch ball in the world coordinate system at time points during the calibration travel of the vehicle;

calculating the average value of the distance between the left lower end and the hitch ball in the world coordinate system or the average value of the distance between the right lower end and the hitch ball in the world coordinate system, an average value of an angle formed by the left lower end, the hitch ball and the right lower end in the world coordinate system, and an average value of the coordinates of the hitch ball in the world coordinate system, by using the coordinates of left lower end, the right lower end and the hitch ball in the world coordinate system at time points during the calibration travel of the vehicle which are not removed; and calculating the coordinate of the left lower end in the world coordinate system at a predetermined time point after the calibration travel of the vehicle and the coordinate of the right lower end in the world coordinate system at the predetermined time point, based on a hitch angle of the trailer at the predetermined time point, the average value of the distance between the left lower end and the hitch ball in the world coordinate system or the average value of the distance between the right lower end and the hitch ball in the world coordinate system, the average value of the angle formed by the left lower end, the hitch ball and the right lower end in the world coordinate system, and the average value of the coordinates of the hitch ball in the world coordinate system.

* * * * *